(12) United States Patent
Volta

(10) Patent No.: US 10,712,552 B2
(45) Date of Patent: Jul. 14, 2020

(54) BLADELESS DUST REMOVAL SYSTEM FOR COMPACT DEVICES

(71) Applicant: Datalogic IP Tech S.r.l., Lippo di Calderara di Reno (IT)

(72) Inventor: Valentina Volta, Lippo di Calderara di Reno (IT)

(73) Assignee: DATALOGIC IP TECH S.R.L., Lippo di Calderara (IT)

( * ) Notice: Subject to any disclaimer, the term of this patent is extended or adjusted under 35 U.S.C. 154(b) by 0 days.

(21) Appl. No.: 15/753,749

(22) PCT Filed: Aug. 22, 2016

(86) PCT No.: PCT/IB2016/055014
§ 371 (c)(1),
(2) Date: Feb. 20, 2018

(87) PCT Pub. No.: WO2017/033122
PCT Pub. Date: Mar. 2, 2017

(65) Prior Publication Data
US 2018/0284427 A1    Oct. 4, 2018

Related U.S. Application Data

(60) Provisional application No. 62/208,168, filed on Aug. 21, 2015.

(51) Int. Cl.
*G02B 27/00* (2006.01)
*F04D 25/08* (2006.01)
*F04D 25/06* (2006.01)

(52) U.S. Cl.
CPC .......... *G02B 27/0006* (2013.01); *F04D 25/06* (2013.01); *F04D 25/08* (2013.01)

(58) Field of Classification Search
None
See application file for complete search history.

(56) References Cited

U.S. PATENT DOCUMENTS 2,488,467 A    11/1949    De Lisio
4,561,732 A *  12/1985    Japes .................... B60R 1/0602
                                                  359/509

(Continued)

FOREIGN PATENT DOCUMENTS

CN    204239348 U      4/2015
JP    2001108880 A *   4/2001

(Continued)

OTHER PUBLICATIONS

Strickland, Jonathan et al., "How the Dyson Bladeless Fan Works", 7 pages. Accessed Aug. 10, 2016 at: http://electronics.howstuffworks.com/gadgets/home/dyson-bladeless-fan.htm/printable.

*Primary Examiner* — Derek S. Chapel
(74) *Attorney, Agent, or Firm* — Shook, Hardy & Bacon, L.L.P.

(57) ABSTRACT

Bladeless dust removal systems incorporate a bladeless fan system to remove dust particles from compact devices when in operation. Tubular elements are configured in the bladeless fan system to direct air flow in a direction. As the air flows, induction and entrainment occur to increase air flow inside the compact device. An exhaust opening can be implemented, which allows air containing dust particles to exit from the compact device when the bladeless fans system is in operation.

20 Claims, 6 Drawing Sheets

(56) References Cited

U.S. PATENT DOCUMENTS

| | | | |
|---|---|---|---|
| 5,424,806 A | 6/1995 | Siegel | |
| 5,862,037 A * | 1/1999 | Behl | F04D 25/08 |
| | | | 361/679.48 |
| 7,374,294 B2 * | 5/2008 | Willey | G02B 7/008 |
| | | | 359/399 |
| 7,931,449 B2 | 4/2011 | Fitton et al. | |
| 7,972,111 B2 | 7/2011 | Crawford et al. | |
| 8,052,379 B2 | 11/2011 | Gammack | |
| 8,714,937 B2 | 5/2014 | Fitton et al. | |
| 8,721,286 B2 | 5/2014 | Gammack et al. | |
| 8,721,307 B2 | 5/2014 | Li | |
| 8,734,121 B2 | 5/2014 | Tsen | |
| 8,764,412 B2 * | 7/2014 | Gammack | F04D 25/06 |
| | | | 239/434.5 |
| 8,784,049 B2 | 7/2014 | Gammack et al. | |
| 8,784,071 B2 | 7/2014 | Gammack | |
| 8,882,451 B2 | 11/2014 | Fitton et al. | |
| 8,932,028 B2 | 1/2015 | Fitton et al. | |
| 8,950,036 B2 * | 2/2015 | Kaihotsu | H04N 5/2254 |
| | | | 15/301 |
| 9,011,116 B2 | 4/2015 | Li | |
| 2004/0175202 A1 | 9/2004 | Fujita | |
| 2006/0068696 A1 * | 3/2006 | Ashford | G08B 13/18 |
| | | | 454/188 |
| 2008/0205878 A1 * | 8/2008 | Owashi | B08B 5/04 |
| | | | 396/429 |
| 2008/0285132 A1 * | 11/2008 | O'Kane | G02B 27/0006 |
| | | | 359/509 |
| 2009/0060711 A1 | 3/2009 | Gammack et al. | |
| 2010/0091083 A1 * | 4/2010 | Itami | B41J 2/471 |
| | | | 347/261 |
| 2011/0023915 A1 * | 2/2011 | McConnell | B60S 1/60 |
| | | | 134/34 |
| 2012/0118327 A1 * | 5/2012 | Mazmanyan | B08B 5/04 |
| | | | 134/21 |
| 2016/0001330 A1 * | 1/2016 | Romack | B08B 3/02 |
| | | | 134/18 |
| 2016/0209645 A1 * | 7/2016 | Britton | G01N 21/15 |

FOREIGN PATENT DOCUMENTS

| | | |
|---|---|---|
| JP | 2001108880 A | 4/2001 |
| JP | 2012168457 A | 9/2012 |
| WO | 2017033122 A1 | 3/2017 |

* cited by examiner

BLADELESS DUST REMOVAL SYSTEM FOR COMPACT DEVICES

CROSS-REFERENCE TO RELATED APPLICATIONS

This application claims priority to PCT/IB2016/055014, filed Aug. 22, 2016, entitled "Bladeless Dust Removal System For Compact Devices," which claims the benefit of U.S. Provisional Application No. 62/208,168, filed Aug. 21, 2015, entitled "Bladeless Dust Removal System For Compact Devices," under 35 U.S.C. § 119(e). All of the aforementioned applications are incorporated in their entirety by reference herein.

TECHNICAL FIELD OF THE INVENTION

The present invention relates to a device for the removal of dust from electro-optical devices.

BACKGROUND OF THE INVENTION

The usage of electro-optical devices in a dusty environment substantially diminishes the performance of said devices and requires regular maintenance and cleaning procedures. Additional problems arise when the electro-optical device is compact and does not have the necessary physical space to use traditional fan systems with moving blades. Some manufacturers have created a bladeless fan to move large quantities of air in an environment as shown in FIG. 1. However, the design of such bladeless fan is not suitable for a usage in compact electro-optical devices due to the size and generated air flow. The design of a non-intrusive dust removal system would substantially benefit the usability of compact devices and decrease the cost of their maintenance.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention detail a bladeless fan system that functions in a compact device such as laser and imaging devices. The bladeless fan system functions in portable or handheld devices, which cannot accommodate traditional fan systems with moving blades.

In a first aspect, a bladeless dust removal system is provided that includes a source of air in a compact electro-optical device that operates to generate air flow. Tubular elements in the compact electro-optical device operate to receive air from the source of air, operate to handle air, and operate to allow an expulsion of air through openings in the walls of the tubular elements. The tubular elements connect together through links. The openings in the walls of the tubular elements are positioned so that air flows through the openings in a substantially uniform direction in the compact electro-optical device. The air flows such that the air is expelled from the compact electro-optical device.

In a second aspect, a compact electro-optical device having a bladeless dust removal system is provided that includes a housing comprising the bladeless dust removal system and components of the compact electro-optical device. The bladeless dust removal system includes a source of air, preferably a motor compartment, and tubular elements in the device. The source of air operates to generate air flow. The tubular elements operate to receive air from the source of air, to handle air, and allow an expulsion of air through a lateral opening between the walls of the tubular elements. A portion of an interior wall of the tubular elements overhangs or overlaps a portion of an exterior wall of the same tubular elements. The tubular elements connect together through links. The openings between the walls of the tubular elements are positioned so that air flows through towards an exhaust opening located embedded in the housing. The exhaust opening is located embedded in the housing to allow air to escape from an interior of the housing. Dust is expelled with the air through the exhaust opening.

BRIEF DESCRIPTION OF THE DRAWINGS

Embodiments of the invention are illustrated by way of example and not limited in the accompanying figures in which like reference numerals indicate similar elements and in which.

DETAILED DESCRIPTION OF THE INVENTION

Figure 1:
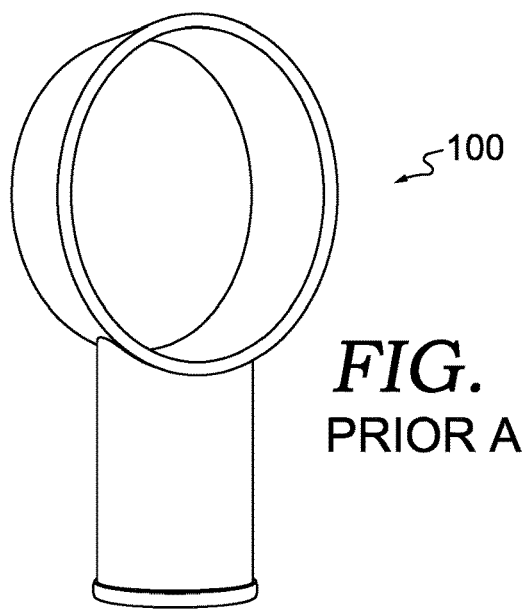
FIG. 1 is a diagram of a bladeless fan that is used to move large quantities of air.

The subject matter of the embodiments of the invention is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In a first aspect, a bladeless dust removal system is provided that includes a source of air in a device that operates to generate air flow. Tubular elements in the device operate to receive air from the source of air, operate to handle air, and operate to allow an expulsion of air through openings in the walls of the tubular elements. The tubular elements connect together through links. The openings in the walls of the tubular elements are positioned so that the air flows through the openings in a substantially uniform direction in the device. The air flows such that the air is expelled from the device.

In a second aspect, a compact electro-optical device having a bladeless dust removal system is provided that includes a housing comprising the bladeless dust removal system and components of the electro-optical device. The bladeless dust removal system includes a source of air, preferably a motor compartment, and tubular elements in the device. The motor compartment operates to generate air flow. The tubular elements operate to receive air from the source of air, to handle air, and allow an expulsion of air through a lateral opening between the walls of the tubular elements. A portion of an interior wall of the tubular elements overhangs or overlaps a portion of an exterior wall of the same tubular elements. The tubular elements connect together through links. The openings between the walls of the tubular elements are positioned so that air flows through towards an exhaust opening located embedded in the housing. The exhaust opening is located embedded in the housing to allow air to escape from an interior of the housing. Dust is expelled with the air through the exhaust opening.

In a third aspect, a scanner has a dust removal system that includes a compartment and a scanner module. The compartment includes the bladeless dust removal system. The scanner module includes components of a compact electro-optical device. The bladeless dust removal system includes a source of air to generate air flow. Tubular elements receive air from the source of air, handle air within itself, and allow an expulsion of air through a lateral opening between the walls of the tubular elements. A portion of an interior wall of the tubular elements overhangs a portion of an exterior wall of the tubular elements. Tubular elements connect together through links. The lateral opening between the walls of the tubular elements are positioned so that air flows through towards an exhaust opening located embedded in the scanner module. The exhaust opening located embedded in the scanner mule to allow air to pass from an interior of the compartment of the scanner module. Dust is expelled with the air through the exhaust opening.

Embodiments of the invention disclose a bladeless dust removal system that functions in compact devices, such as laser scanner and other electro-optical devices. The bladeless dust removal system incorporates tubular elements instead of a rotating fan. Air passes in and through the tubular elements causing air flow to move into a particular direction. In an exemplary embodiment, air flow occurs through the process of induction and entrainment.

In FIG. 1, a bladeless fan manufactured by Dyson Ltd. of Malmesbury, United Kingdom is shown in a fan 100. The design of fan 100 is not suitable for usage in compact electro-optical devices due to size and generated air flow. Compact electro-optical devices tend to be small and can range from 5 centimeters to 15 centimeters in diameter, length, or height.

Figure 2A:
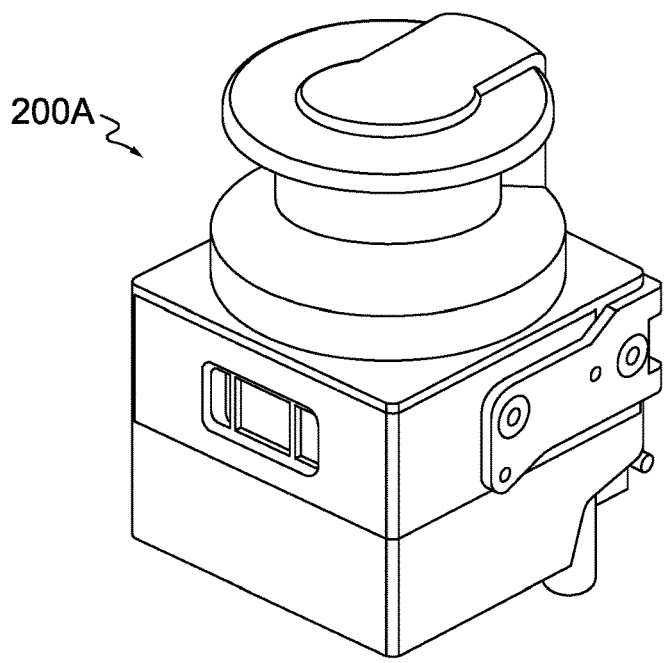
FIG. 2A is a diagram of an exemplary laser scanning device.
Figure 2B:
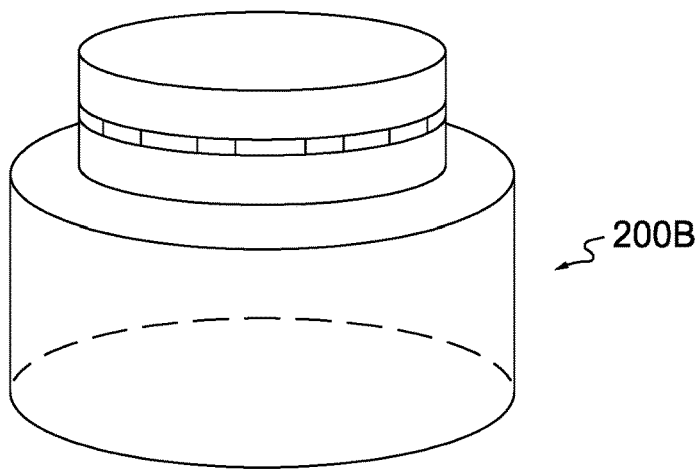
FIG. 2B is another diagram of an exemplary laser scanning device.

In FIGS. 2A and 2B, laser scanning devices 200A and 200B are shown and incorporate a bladeless dust removal system. The laser scanning devices are compact and can be portable or handheld. Because of the compact size of the laser scanning devices, traditional fan systems are not suitable for implementation into the laser scanning devices. The compact nature of the laser scanning devices can still accommodate a bladeless fan system, which allows air to flow through the devices and be expelled through an exhaust opening.

Figure 3A:
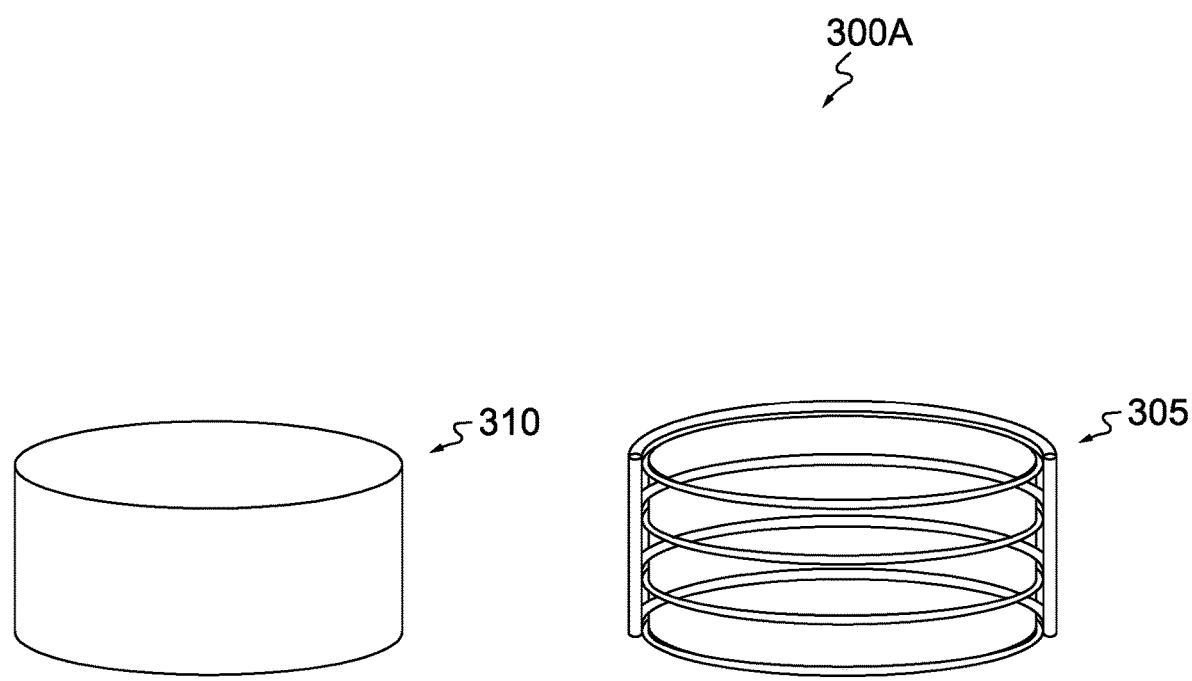
FIG. 3A is a diagram of an exemplary bladeless fan system with a housing and a stack of tubular elements.
Figure 3B:
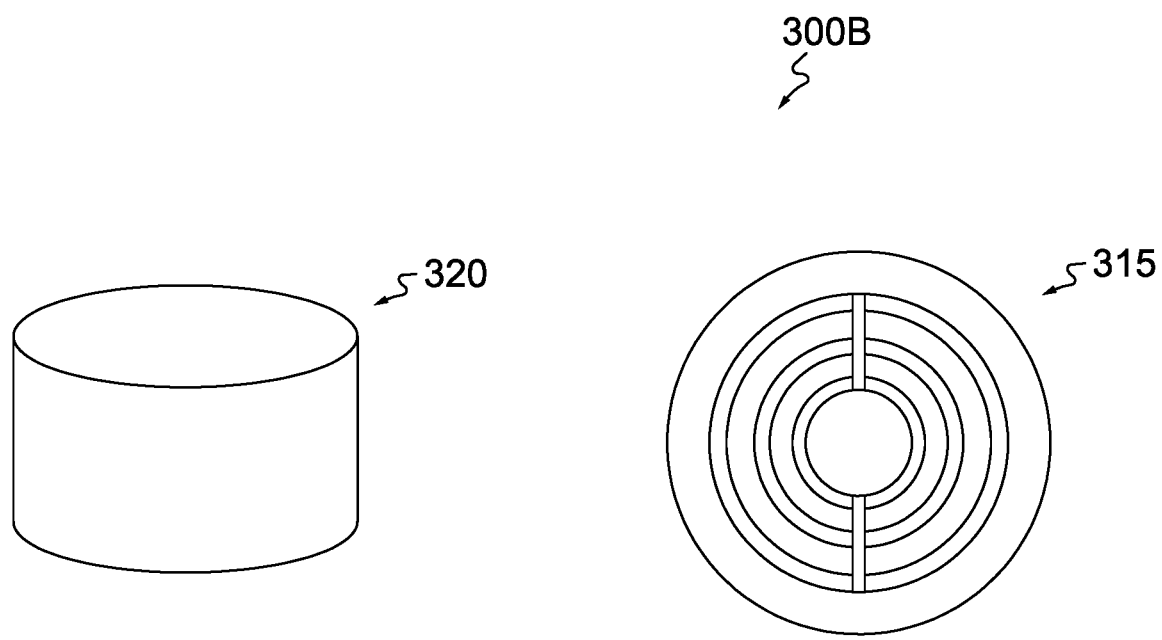
FIG. 3B is another diagram of an exemplary bladeless fan system with a housing and a singular layer of enclosed tubular elements.

Continuing with FIGS. 3A and 3B, a bladeless fan system, with a housing and tubular elements, is shown. The tubular elements can vary in size, shape, and configuration. For example, in FIG. 3A, the bladeless fan system 300A incorporates a stack of tubular elements 305 in a housing 310. The tubular elements 305 are positioned as parallel rings that are connected together with links. Although the terms tubular elements are used, other terminology can be used to describe the tubular elements such as piping, tube, etc. Also, it is noted that the stack of tubular elements 305 can be sized and configured to fit within the compact structure of an electro-optical device. In FIG. 3B, the bladeless fan system 300B incorporates a single layer of enclosed tubular elements 315 (or single layer of multiple tubular elements) of different sizes enclosed in a housing 320. The tubular elements 315 have members incorporating different diameters. Each member of the tubular elements 315 has a unique diameter. The enclosed tubular elements 315 (or multiple tubular elements) are connected together with links. FIGS. 3A and 3B illustrate the versatility in implementing embodiments of the invention. Tubular elements can be shaped and configured in a variety of ways so long as the implementation allows air to flow from the tubular elements. The air flow direction can be developed so that the benefits of the bladeless fan system are achieved to remove dust particles.

Figure 4:
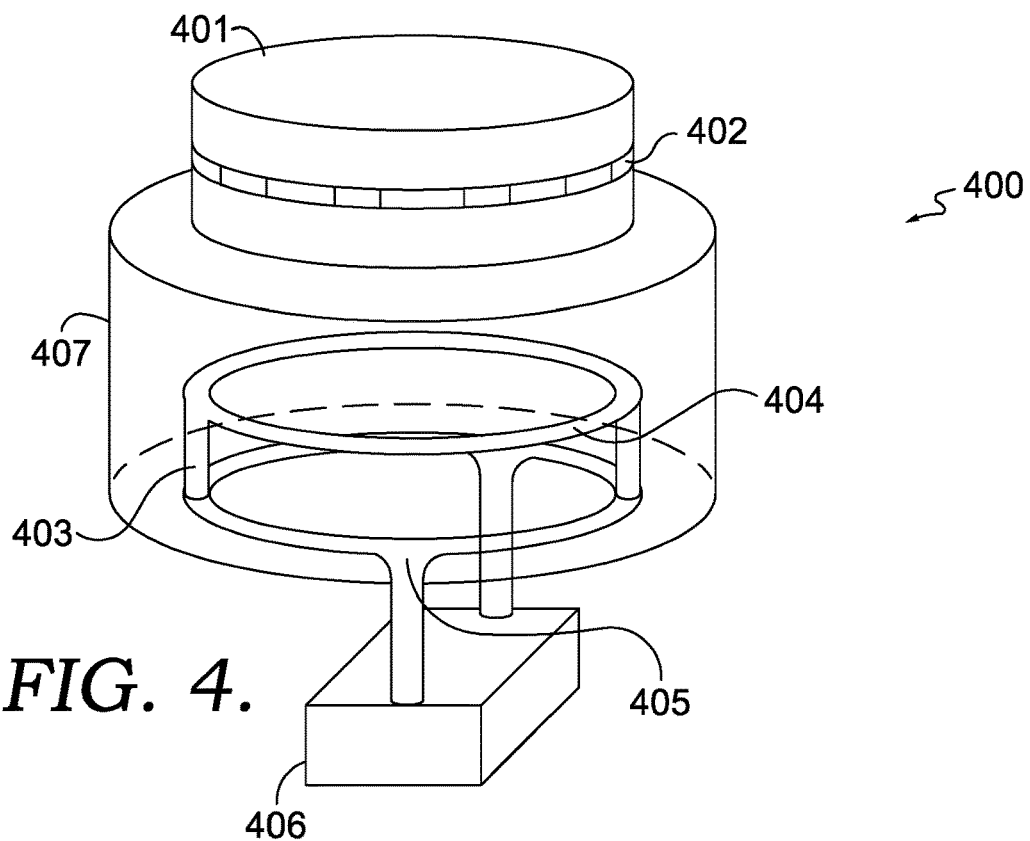
FIG. 4 is a diagram of an exemplary bladeless fan system incorporated into a scanner, implemented in accordance with embodiments of the invention.

In FIG. 4, a bladeless fan system is incorporated into a scanner 400. In embodiments of the invention, the bladeless fan system includes a two-level tubular structure 404. The tubular elements 404 receive air flow from a motor compartment 406 through a pipe 405. As air flows through the tubular elements 404, the air escapes from a lateral opening between an overhang or overlap of the interior and exterior walls of the tubular elements 404. The tubular elements 404 are connected to each other through links 403. It is noted that the links 403 can be of a same or different material as the tubular elements 404. Such material can be metal, plastic, or other suitable material for providing air flow. The dust from inside the scanner passes from a housing 407 and is removed through slots 402 in a compartment 401 of the bladeless fan system. These slots 402 can be found on the periphery or top surface of the scanner 400. These slots 402 also lead to the exterior of the scanner 400.

In another embodiment of the invention, the scanner can incorporate a bladeless fan system that includes a single layer of enclosed tubular elements or a singular layer of multiple tubular elements of different sizes. Each circular tubular element has a different diameter than another circular tubular element. However, the tubular elements are positioned in the same plane.

Further, in another embodiment, scanner 400 can incorporate tubular elements or pipes that supply clean air into the motor compartment from an outside air source or "Air Filtration Station". This embodiment enables clean air to enter the system, further aiding the process of removing dust. Likewise, in yet another embodiment, motor compartment 406 can be removed and replaced with an external air intake source. The air intake source could be connected directly to pipe 405.

As another embodiment of the invention, the bladeless fan system can be incorporated into the walls of the housing of the scanner. The tubular elements can be manufactured to be located inside the wall of the housing. In this way, there would be no additional elements inside the device.

Figure 5:
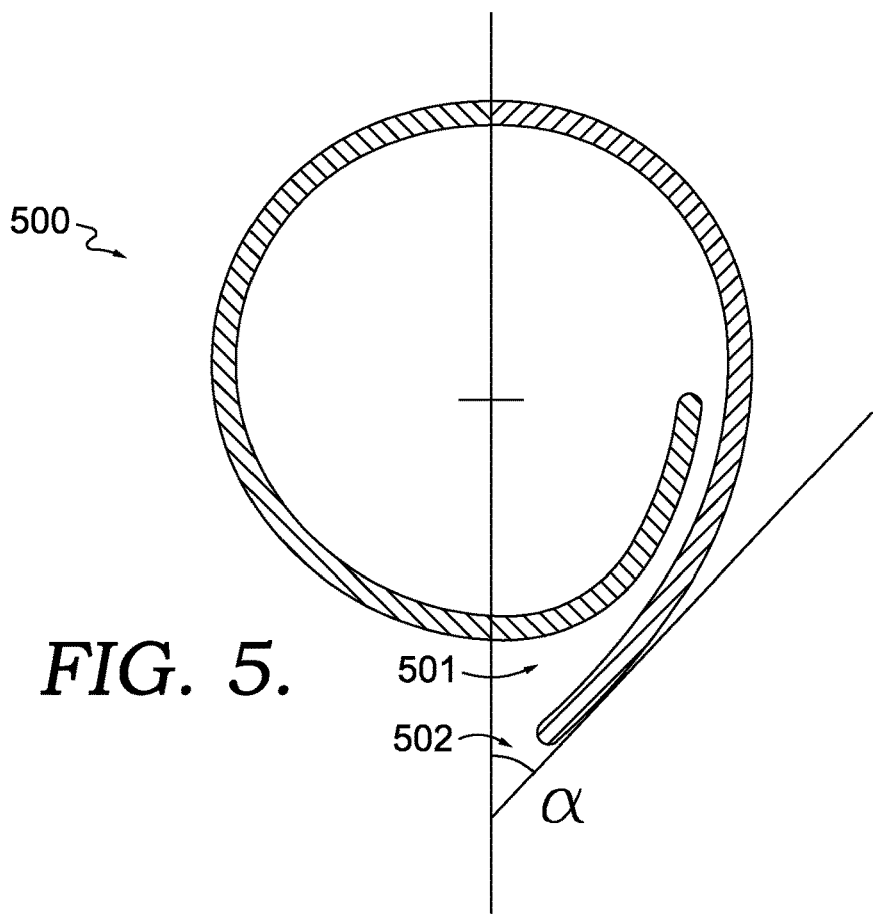
FIG. 5 is an exemplary tubular element with a nozzle structure.

Turning to FIG. 5, a nozzle structure 501 is shown of a tubular element 500. More specifically, FIG. 5 is a cross-sectional view of the tubular element 500. Rather than holes placed in the walls of the tubular elements, the tubular elements are designed so that there is an exit angle of a nozzle 502 along the entire pathway of the tubular elements based on the construction of the tubular element. As air is pushed into the tubular elements, air will escape where the two portions of the tubular element come closest together. In some embodiments, air escapes from an overhang or overlap of the interior and exterior walls of the tubular elements. Where the air escapes, air will flow in substantially the same direction. The exit angle of the air can be optimized to secure the most efficient air movement inside the scanner, taking into account the location, orientation, and size of internal components. In another embodiment, the air can escape at the nozzle 502, which is at an end of the tubular element 500.

Figure 6:
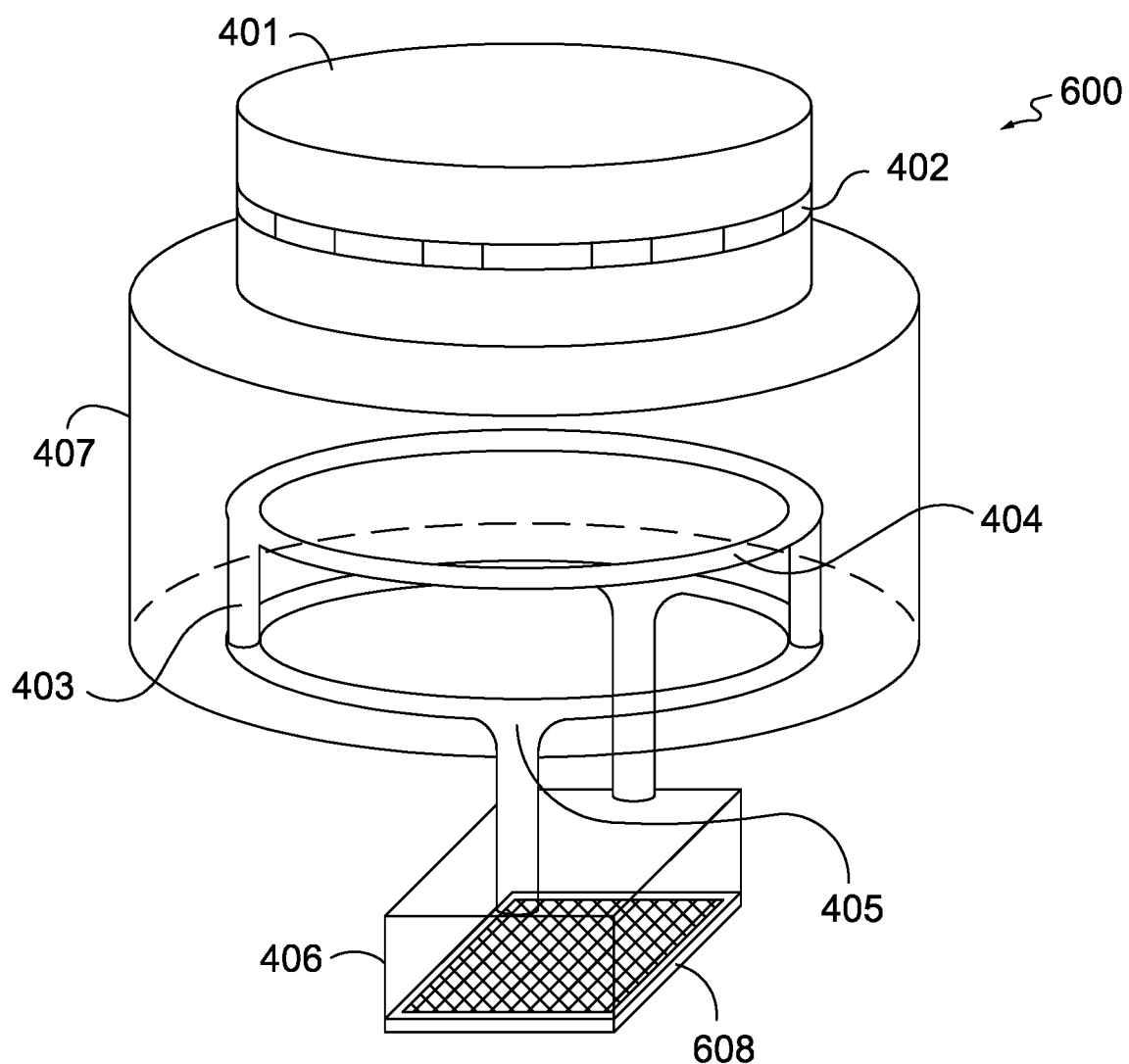
FIG. 6 is a diagram of an exemplary bladeless fan system incorporated into a scanner with a removable filter, implemented in accordance with embodiments of the invention.

In FIG. 6, a bladeless fan system is incorporated into a scanner 600. Scanner 600 is similar to scanner 400 in FIG. 4 with the difference being that FIG. 6 includes a filter 608 to clean air before supplying it to the tubular elements 404. Motor compartment 406 can, alternatively or in addition, incorporate a removable filter, such as filter 608. Outside particles can be removed by filter 608 or discarded.

Figure 7:
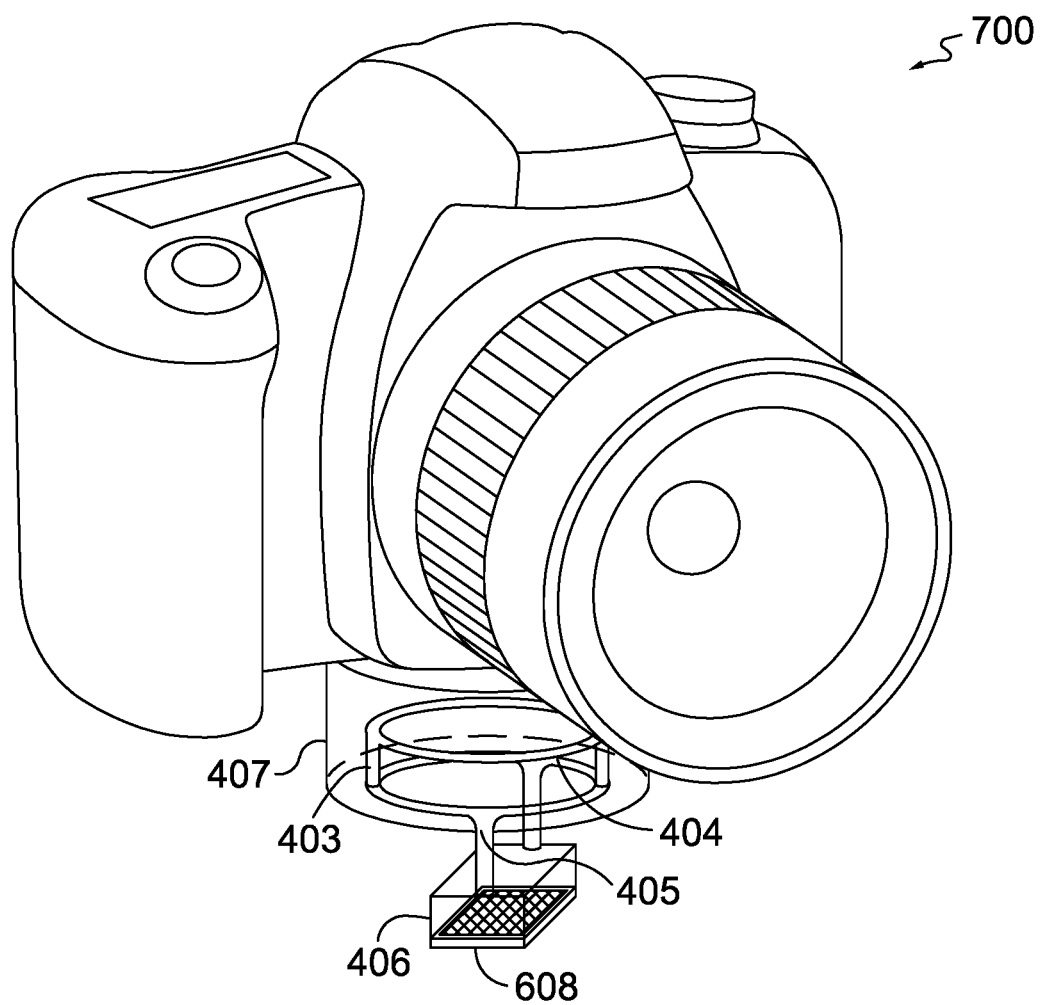
FIG. 7 is a diagram of an exemplary bladeless fan system incorporated into a smart camera, implemented in accordance with embodiments of the invention.

Turning now to FIG. 7, a camera 700, preferably a smart camera, is shown attached to bladeless fan system 600. Bladeless fan system 600 filters air that might be dirty. The bladeless fan system can attach to the smart camera, but it can also be detached when necessary. For example, the bladeless dust removal system can be used in smart cameras for machine vision applications (e.g. object recognition), where the smart camera requires continuous dust removal from the lens cover. In an embodiment, the air source may be specified to come from a "clean, dry" air source or a factory wide air system. If the air source is generated by motor 406 attached to the bladeless dust fan removal system, filter 608 can be used to clean the air before the air is sent through the bladeless dust removal system to clean or remove dust particles in camera 700, such as lens or lens cover.

In implementing embodiments of the present invention, one may consider the effect on the device Ingress Protection (IP) rating, also known as International Protection rating. The IP rating (or IP code) is a classification of the degrees of protection provided against the intrusion of solid objects and liquid objects. For example, consideration can be given to the ingress of air at pipes 405 and egress of air at slots 402 due to the holes needed for air intake and exhaust. Some systems must have a particular IP code. For example, the IP65/67 code indicates there should be no ingress of dust and there should be a complete protection against contact with dust. Also, water projected from jets against an enclosure from any direction shall have no harmful effects. And finally, ingress of water in harmful quantities shall not be possible when the enclosure is immersed in water under defined conditions of pressure and time.

However, one possible way to solve the issue and have a device (e.g. a laser scanner) that is IP65/67 compliant, can be to have an external housing that includes the main housing of the device (i.e. the housing that has openings for air exhaust, as described in the Specification). Such external housing provides high IP rating, as required in many applications, but would be removable, when needed, to allow air exhausting according to the described invention.

Another possible drawback of electro-optical devices can be electrostatic charging that can be caused by the air on a plastic window of the device. This electrostatic charge can appear on a window that allows exit of light, laser light for example, for barcode reading or distance measuring, end entry of diffused light from the external ambient, object, barcodes surface. So, it could be necessary to use ionized air. The source of air, such as a motor or motor compartment, generates ionized air.

While the embodiments of the invention are susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the embodiments of the invention.

The embodiments of the invention have been described in relation to a particular dust removal system in an electro-optical device, which are intended in all respects to be illustrative rather than restrictive. Alternative embodiments will become apparent to those of ordinary skill in the art to which the invention pertains without departing from its scope.

What is claimed is:

1. A bladeless dust removal system for removing dust within a housing of a compact electro-optical device, the system comprising:
   a source of air operable to generate an air flow;
   a plurality of tubular elements located within the housing of the compact electro-optical device and operable to receive air from the source of air, operable to handle air within itself, and operable to allow an expulsion of air through openings in the walls of the plurality of tubular elements, wherein:
   the plurality of tubular elements connects together through one or more links and the compact electro-optical device ranges from 5 centimeters to 15 centimeters in diameter;
   the openings in the walls of the plurality of tubular elements positioned so that air flows through the openings in a substantially uniform direction in the compact electro-optical device; and
   the air flows into the housing of the compact electro-optical device such that the air and internal dust within the housing is expelled from the compact electro-optical device out of slots disposed proximate a periphery of the housing.

2. The system of claim 1, wherein the one or more links allow the expulsion of air through openings in the sides of the one or more links.

3. The system of claim 1, wherein the source of air connects to the plurality of tubular elements through one or more pipes.

4. The system of claim 3, wherein the plurality of tubular elements comprise a stack of tubular elements positioned in parallel to each other, wherein each tubular element has a substantially same uniform size.

5. The system of claim 3, wherein the plurality of tubular elements comprise a single layer of multiple tubular elements positioned in a concentric pattern with one tubular element having a different diameter from another tubular element.

6. The system of claim 3, further comprising a removable filter attached such that the source of air is clean air that enters the compact electro-optical device.

7. The system of claim 6, wherein the source of air is an external air intake source that connects to the one or more pipes.

8. The system of claim 6, wherein the source of air is a motor.

9. The system of claim 8, wherein the compact electro-optical device is less than fifteen (15) centimeters at its most extended two points.

10. A compact electro-optical device, comprising:
a housing;
components located within the housing;
a motor compartment with a motor operable to generate an air flow;
a plurality of tubular elements of a bladeless dust removal system located within the housing of the compact electro-optical device operable to receive air from the motor compartment, operable to handle air within itself, and operable to allow an expulsion of air through a lateral opening between the walls of the plurality of tubular elements, wherein a portion of an interior wall of the plurality of tubular elements overhangs a portion of an exterior wall of the plurality of tubular elements, wherein:
the plurality of tubular elements connect together through one or more links and the compact electro-optical device ranges from 5 centimeters to 15 centimeters in diameter;
the lateral opening between the walls of the plurality of tubular elements positioned so that air flows through towards an exhaust opening located embedded in the housing; and
the exhaust opening located embedded in the housing to allow air and internal dust within the housing to escape from an interior of the housing, wherein dust is expelled with the air through the exhaust opening.

11. The compact electro-optical device of claim 10, wherein the one or more links allow a flow of air to reach the plurality of tubular elements.

12. The compact electro-optical device of claim 11, wherein the motor compartment connects to the plurality of tubular elements through one or more pipes.

13. The compact electro-optical device of claim 12, wherein the plurality of tubular elements comprise a stack of tubular elements positioned in parallel to each other, wherein each tubular element has a substantially same uniform size.

14. The compact electro-optical device of claim 12, wherein the plurality of tubular elements comprise a single layer of multiple tubular elements positioned in a concentric pattern with one tubular element having a different diameter from another tubular element.

15. The compact electro-optical device of claim 12, further comprising a removable filter attached such that the source of air is clean air that enters the compact electro-optical device.

16. The compact electro-optical device of claim 15, further comprising the motor compartment is replaced by an external air intake system that connects to the one or more pipes.

17. A scanner comprising:
a housing having an embedded exhaust opening in a compartment thereof;
components located within the housing;
a bladeless dust removal system comprising:
a source of air operable to generate an air flow;
a plurality of tubular elements located within the housing and operable to receive air from the source of air, operable to handle air within itself, and operable to allow an expulsion of air through a lateral opening between the walls of the plurality of tubular elements, wherein a portion of an interior wall of the plurality of tubular elements overhangs a portion of an exterior wall of the plurality of tubular elements, wherein:
the plurality of tubular elements connects together through one or more links and the scanner ranges from 5 centimeters to 15 centimeters in diameter;
the lateral opening between the walls of the plurality of tubular elements positioned so that air flows through towards the exhaust opening embedded in the compartment of the housing; to allow air and internal dust within the housing to pass from an interior of the housing and be expelled from the housing through the exhaust opening.

18. The scanner of claim 17, wherein the one or more links allow a flow of air to reach the plurality of tubular elements.

19. The scanner of claim 18, wherein the source of air connects to the plurality of tubular elements through one or more pipes.

20. The scanner of claim 19, wherein the entirety of each of the plurality of tubular elements form a nozzle structure with an exit angle.

* * * * *